United States Patent
Plochl et al.

(10) Patent No.: US 6,443,354 B1
(45) Date of Patent: Sep. 3, 2002

(54) PROCESS FOR THE PRODUCTION OF A COMPOSITE COMPONENT THAT CAN RESIST HIGH THERMAL STRESS

(75) Inventors: Laurenz Plochl, Oberdrauburg; Bertram Schedler, Ehenbichl, both of (AT)

(73) Assignee: Plansee Aktiengesellschaft, Reutte Tirol (AT)

( * ) Notice: Subject to any disclaimer, the term of this patent is extended or adjusted under 35 U.S.C. 154(b) by 0 days.

(21) Appl. No.: 09/489,654

(22) Filed: Jan. 24, 2000

(30) Foreign Application Priority Data

Feb. 5, 1999 (AT) .............................................. 71/99 U

(51) Int. Cl.[7] .............................................. B23K 28/00
(52) U.S. Cl. ....................................... 228/178; 228/196
(58) Field of Search ................................ 228/178, 176, 228/190, 193, 194, 195, 196; 29/419.1; 428/544, 545

(56) References Cited

U.S. PATENT DOCUMENTS

| 3,648,355 A | * | 3/1972 | Shida et al. |
| 3,981,427 A | * | 9/1976 | Brookes |
| 4,116,266 A | * | 9/1978 | Sawata et al. |
| 4,358,046 A | * | 11/1982 | Detz et al. |
| 4,966,226 A | * | 10/1990 | Hamburgen |
| 5,244,748 A | * | 9/1993 | Weeks, Jr. et al. |
| 5,410,796 A | * | 5/1995 | Weeks, Jr. |

* cited by examiner

Primary Examiner—Tom Dunn
Assistant Examiner—Jonathan Johnson
(74) Attorney, Agent, or Firm—Morgan & Finnegan, L.L.P.

(57) ABSTRACT

The invention provides a process for the production of a composite structural part which can withstand high thermal stress, consisting of at least one graphite part and at least one metal part made of a hardenable copper alloy. In accordance with the invention, the metal part is bonded, by a hot isostatic press process, with the graphite part, which has a layer made of copper or a copper alloy on the bonding surface. In this way, it is possible to use copper-chromium-zirconium alloys with more complex composite structural part constructions and with thin-wall parts of the metal component, without the good mechanical characteristics of the copper-chromium-zirconium alloy being destroyed.

7 Claims, No Drawings

PROCESS FOR THE PRODUCTION OF A COMPOSITE COMPONENT THAT CAN RESIST HIGH THERMAL STRESS

BACKGROUND OF THE INVENTION

The present invention relates to a process for the production of a composite component that can resist high thermal stress. The composite comprises at least one graphite part and at least one metal part made of a hardenable copper alloy, which is surface-bonded to the graphite part.

As a result of its special characteristics, such as high thermal stress capacity, good thermal conductivity, and low pulverization rate, graphite is very suitable for structural parts that are under strong thermal stress. Graphite is used in very different forms, such as polycrystalline graphite, pyrolytic graphite, or even fiber-reinforced graphite. A disadvantage of graphite is that it has only limited mechanical strength and ductility in the fiber-reinforced form. Moreover, because of leakage, the porosity of the graphite generally prohibits direct contact with liquids, such as is necessary for sufficient dissipation of heat with actively cooled thermal shields. Therefore, as a rule, the situation is such that for structural parts under high thermal stress, graphite is not generally used alone, but rather in combination with metal parts, which serve as carriers that can withstand mechanical stress and with actively cooled structural parts, also for the conduction of the used cooling media. A good high temperature-resistant bonding of graphite parts with metal parts, which generally is brought about by a high-temperature soldering, is therefore important.

Generally, metal parts bonded with graphite should have thermal expansion coefficients similar to those of graphite, in order to avoid thermal stresses of the composite structural part and moreover, to retain the strength values required at high temperature for the maintenance of sufficient stability. If the composite structural parts are used in fusion reactors, good stress capacity under neutron stress is also of importance.

Molybdenum has proven to be a good material for the metal parts. An actively cooled cooling device, in which one or more parts of graphite are bonded with cooling agent conduits made of molybdenum, is described, for example, in DE 34 16 843 A1. The disadvantage of such composite structural parts which use molybdenum as a material for the metal parts are the relatively high costs and the difficulty in processing and welding molybdenum. Therefore, an attempt has been made to replace molybdenum with other high temperature-resistant metals, for example, high-strength copper alloys. Such a copper alloy, which exhibits practically no structural conversion up to the melting point and thus retains its good high-temperature characteristics, is, for example, a dispersion-reinforced copper alloy, with fine $Al_2O_3$ dispersoids embedded in a copper matrix.

This alloy can be soldered also with high-temperature solders at approximately 900° C., without disadvantageous effects on its mechanical characteristics, so that parts made of this alloy can be bonded with parts made of graphite.

One disadvantage of this copper alloy is that its fracture toughness drops below a critical minimum with neutron stress, so that it is suitable, in only a qualified manner, for structural parts which are to be used in fusion reactors.

Other known copper alloys which have optimal high-temperature strength characteristics are hardenable copper-chromium-zirconium alloys made of approximately 0.3–1.2 wt % chromium, 0.03–0.3 wt % zirconium, and the remainder, copper.

In comparison to dispersion-reinforced copper alloys, these alloys have, above all, substantially better values for fracture toughness after neutron stress, so that they are basically very suitable for structural parts used in fusion reactors.

Copper-chromium-zirconium alloys are hardenable alloys that attain their good characteristics with respect to strength and elongation by a special process during production and by a final hardening cycle at approximately 500° C. In order to retain these good characteristics in the hardened state, these alloys should not exceed the hardening temperature of 500° C. in further processing, in particular, during the bonding with the parts made of graphite or in use, since otherwise, fatigue of the alloy occurs and strength values rapidly decline.

Thus, the known high-temperature soldering for the bonding of parts made of this alloy with graphite parts is practically out of the question. One possibility of bonding graphite with parts made of high-strength copper alloys, among others also, made of copper-chromium-zirconium alloys, without damaging the rigidity of the composite structural parts by the bonding process, is the use of electron beam welding, as it is described, for example, in EP 0 741 116 A1. One disadvantage of that process is that it is only suitable for parts made of copper-chromium-zirconium alloys having a relatively large wall thickness. In the case of structural parts with thin walls, the heat, which appears during the electron beam welding and is, in fact, relatively low, is still too great to rule out a decline in the good mechanical characteristics of the copper-chromium-zirconium alloy. Moreover, especially with more complex structural parts, for example, with actively cooled installations, where several graphite parts must be bonded in several planes with cooling agent conduits, electron beam welding cannot be used frequently because of an insufficient accessibility of the surfaces to be bonded.

OBJECT OF THE INVENTION

The object of the present invention is to create a process for the production of a composite structural part having a high thermal stress capacity, which can be used even with thin-wall parts made of copper-chromium-zirconium alloys, or with more complex composite structural part constructions, without the good mechanical characteristics of the copper-chromium-zirconium alloy in the hardened state being destroyed.

SUMMARY OF THE INVENTION

In accordance with the invention, these objectives are obtained by employing the HIP (hot isostatic press processes) process to bond a metal part with a graphite part wherein a layer of copper or of a copper alloy is provided on the bonding surface.

DETAILED DESCRIPTION OF THE INVENTION

With the known HIP processes for the bonding of different materials, temperatures are usually used which are at least 70% of the melting point of the lower-melting partner to be joined. Simultaneously, high pressures in the range of clearly over 1000 bar are applied, so as to attain sufficient bonding of the individual partners to be joined. Since the use of such high pressures might destroy graphite materials, the use of HIP processes for the bonding of different parts has been limited up to now to only metal partners to be joined. It was a complete surprise when it became evident that by the preparation of a layer of copper or a copper alloy on the bonding surface of the graphite to the metal part, a HIP process can be successfully used to bond different parts even with the use of temperatures and pressures which are clearly lower than were previously common, and the process is therefore suitable for bonding of graphite parts with heat-sensitive, high-strength copper alloys in excellent quality. The layer made of copper or a copper alloy can thereby be presented, in different ways, between the surfaces to be bonded for the partners to be joined. For example, it is conceivable to bond the graphite part with the copper layer before the HIP process, or to place the copper in the form of a thin film between the surfaces to be bonded before the introduction of the HIP process.

In a particularly advantageous embodiment of the process, an alloy with approximately 0.3–1.2 wt % chromium, 0.03–0.3 wt % zirconium, and the remainder, copper, is used as a hardenable copper alloy. When using this alloy, particularly good mechanical characteristics are attained with high-temperature stress even after neutron stress, which are not impaired by using the HIP process to bond with the graphite part, so that such structural parts are particularly suitable for use in fusion reactors.

What has proven particularly advantageous is when the HIP process is carried out at a temperature range between 400°–500° C. with a pressure between 200–1000 bar during a time period between 0.5–8 hours (h).

As another particularly favorable process variant, it has proven advantageous to use the part of the hardenable copper alloy, initially, in an unhardened form, that is, solution-heat-treated and cold-formed state, and to undertake the hardening during the course of the HIP process while bonding with the graphite part.

Another improvement of the process can result in that an intermediate layer, advantageously made of nickel, is provided on the surfaces to be bonded, which are made of copper or a copper alloy and the hardenable copper alloy, wherein a foreign diffusion is attained.

If tubes for the conduit of cooling agents are intended as the metal parts, then it is advantageous to produce the layer of copper or a copper alloy on the bonding surface of the graphite part by backing the borehole wall. The backing of graphite parts with a layer of copper or a copper alloy is a known technique and is, for example, described in detail in EP 0 663 670 A1.

The invention will be explained in more detail below with the aid of an example.

EXAMPLE

In a production example, the production, in accordance with the invention, of a composite structural part which can resist high thermal stress and is in the form of a monoblock configuration and which can be cooled actively by a cooling agent, is provided. As a cooling agent conduit, a tube having an outside diameter of 12 mm, a wall strength of 1 mm, and a length of 100 mm, made of a Cu—Cr—Zr alloy, is used in a solution-heat-treated and cold-formed but unhardened state. In order to attain the isostatic pressure buildup on all sides for the later HIP process, the individual components of the composite structural part, including the pipe, had to be canned vacuum-tight. As canning material, a steel sheet with a thickness of 1 mm was used. Since the direct bonding of the steel can with the Cu—Cr—Zr tube is not possible, short sections of a steel tube were attached on the tube ends of the Cu—Cr—Zr tube via interior, tubular adapters made of nickel and were bonded vacuum-tight with the Cu—Cr—Zr tube by electron beam welding. Subsequently the tube ends were processed mechanically, and the external jacket surface of the Cu—Cr—Zr tube is coated galvanically with a nickel layer which had a thickness of approximately 10 μm.

As graphite parts, six parallelepiped-shaped blocks made of fiber-reinforced graphite with a width of 25 mm, a height of 37 mm, and a thickness of 15 mm were used. The graphite parts were bored to a diameter of 13 mm, in the same manner, approximately centrically, in accordance with the thickness. Then the borehole surfaces were roughened by means of lasers, introducing a large number of boreholes running vertically to the surface and with a diameter of approximately 100 μm. An OFHC (oxygen free high conductivity copper) layer, having a thickness of approximately 0.5 mm, was applied on the surfaces of such pretreated boreholes, according to the process described in EP 0 663 670 A1.

After pushing the graphite parts, lying directly next to one another, onto the Cu—Cr—Zr tube, the structure was canned and evacuated with the steel sheet, vacuum-tight, bonding the steel ends of the Cu—Cr—Zr tube. The structure canned in this manner was brought to a pressure of 750 bar and a temperature of 480° C. at hot isostatic pressure for approximately 3 hours. These values were maintained over a time period of approximately 4 hours and finally brought to normal pressure and room temperature, once more, during a time period of approximately 4 hours. Ground sections, which were made from the monoblock component produced in this manner, exhibited a pore-free bonding zone between the individual parts and the Cu—Cr—Zr tube. Moreover, there were no indications of a destruction of the fiber-reinforced graphite parts. The Cu—Cr—Zr tube exhibited a hardness of more than 160 HV1 which corresponds to the hardness of a completely hardened Cu—Cr—Zr alloy, that is, the hardening of the Cu—Cr—Zr alloy took place automatically within the course of the HIP process.

In addition, disk-shaped shearing samples were taken from the monoblock component produced in accordance with the invention and stressed in the direction of the tube axis. Failure of the sample did not appear on the bonding zones, but rather in the fiber-reinforced graphite itself, with a load of approximately 30 N/mm$^2$, which was typical for the graphite used.

The invention is, in no way, limited to the production example described. Thus, for example, it is also conceivable to produce the composite structural part as a plane tile configuration, in which a tile-shaped part made of fiber-reinforced graphite, which can also be backed with copper or a copper alloy on the bonding surface, and which is bonded with a block-shaped foundation made of a Cu—Cr—Zr alloy, under the essentially identical conditions as described above.

What is claimed is:

1. A process for the production of a thermal stress resistant composite structural part, comprising:
    (a) providing at least one graphite part having a bonding surface,
    (b) providing at least one metal part to be surface bonded to said graphite part, comprised of a hardenable copper alloy,
    (c) providing a layer of copper or a layer of copper alloy at the bonding surface of said graphite part, and
    (d) employing a hot isostatic press process to form said graphite part, said metal part and said layer of copper or said layer of copper alloy into said composite structural part.

2. A process for the production of a thermal stress resistant composite structural part according to claim 1, wherein said hardenable copper alloy, comprises about 0.3–1.2 wt % chromium, 0.03–0.3 wt % zirconium, and the remainder, copper.

3. A process for the production of a thermal stress resistant composite structural part according to claim 1, wherein the hot isostatic press process is carried out in a temperature range between 400° C.–500° C., under a pressure between 200–1000 bar, for a time period between 0.5–8 hours.

4. A process for the production of a thermal stress resistant composite structural part according to claim 1, wherein the hardenable copper alloy is provided in an unhardened state, and the hardening takes place in the course of the hot isostatic press process to bond with said graphite part.

5. A process for the production of a thermal stress resistant composite structural part according to claim 1, wherein an intermediate layer is placed on the surfaces to be bonded, made of copper or a copper alloy of the graphite part and the hardenable copper alloy.

6. A process for the production of a thermal stress resistant composite structural part according to claim 5, wherein said intermediate layer is comprised of nickel.

7. A process for the production of a thermal stress resistant composite structural part, according to claim 1, wherein said metal part is a tube, which is bonded with a corresponding borehole of the graphite part, and wherein said layer made of copper or a copper alloy on the graphite part is produced by backing the borehole walls.

\* \* \* \* \*